US012762683B2

(12) United States Patent
Yi et al.

(10) Patent No.: US 12,762,683 B2
(45) Date of Patent: Oct. 13, 2026

(54) DETECTION METHOD AND SYSTEM OF POWER EQUIPMENT BASED ON MULTISPECTRAL IMAGE

(71) Applicant: Chongqing University, Chongqing City (CN)

(72) Inventors: Yong Yi, Chongqing City (CN); Jinqiao Du, Chongqing City (CN); Tengteng Li, Chongqing City (CN); Fan Yang, Chongqing City (CN); Zhimin Li, Chongqing City (CN); Zikang Yang, Chongqing City (CN); Yuhuan Li, Chongqing City (CN); Xu Tan, Chongqing City (CN)

(73) Assignee: Chongqing University, Chongqing City (CN)

( * ) Notice: Subject to any disclaimer, the term of this patent is extended or adjusted under 35 U.S.C. 154(b) by 269 days.

(21) Appl. No.: 18/689,477

(22) PCT Filed: Apr. 27, 2023

(86) PCT No.: PCT/CN2023/091026
§ 371 (c)(1),
(2) Date: Mar. 6, 2024

(87) PCT Pub. No.: WO2024/108901
PCT Pub. Date: May 30, 2024

(65) Prior Publication Data

US 2025/0139754 A1 May 1, 2025

(30) Foreign Application Priority Data

Nov. 21, 2022 (CN) ........................ 202211463040.0

(51) Int. Cl.
*G06T 7/00* (2017.01)
*G06V 10/764* (2022.01)
*G06V 10/77* (2022.01)

(52) U.S. Cl.
CPC .......... *G06T 7/0004* (2013.01); *G06V 10/764* (2022.01); *G06V 10/7715* (2022.01); *G06T 2207/20081* (2013.01)

(58) Field of Classification Search
CPC ........... G06F 18/00; G06T 2207/20081; G06T 7/0004; G06V 10/764; G06V 10/7715; G06V 10/82; Y04S 10/50
See application file for complete search history.

(56) References Cited

U.S. PATENT DOCUMENTS 11,055,857 B2 * 7/2021 Zhang .................. G06V 10/764
11,100,369 B2 * 8/2021 Li ............................ G06N 3/09
(Continued)

FOREIGN PATENT DOCUMENTS

CN 112131936 A 12/2020
CN 113902965 A 1/2022
(Continued)

OTHER PUBLICATIONS

CN-104809732-B Jun. 20, 2017—machine English translation (Year: 2017).*
(Continued)

*Primary Examiner* — Vu Le
(74) *Attorney, Agent, or Firm* — Siritzky Law, PLLC

(57) ABSTRACT

The present disclosure discloses a detection method and system of power equipment based on a multispectral image, and relates to the field of smart grid information technology. The method includes: obtaining an image of power equipment to be detected, where the image is one of an infrared image, an ultraviolet image, and a visible image; inputting
(Continued)

the image into a pre-trained pixel-based power equipment detection model for detection, and performing classified prediction on pixels in the image to obtain a predicted result; and outputting a predicted image based on the predicted result, where the predicted image is power equipment image with background information removed, and is marked with a name of each piece of equipment. With the implementation of the present disclosure, efficiency and accuracy of power equipment detection can be improved.

9 Claims, 6 Drawing Sheets

(56) References Cited

U.S. PATENT DOCUMENTS

| | | | | |
|---|---|---|---|---|
| 11,102,462 | B2 * | 8/2021 | Abou Shousha | A61B 3/14 |
| 11,107,257 | B1 * | 8/2021 | Diverdi | G06T 7/90 |
| 2019/0130189 | A1 * | 5/2019 | Zhou | G06V 10/7515 |
| 2019/0130580 | A1 * | 5/2019 | Chen | G06V 10/82 |
| 2020/0410274 | A1 * | 12/2020 | Satoh | G06T 1/0007 |
| 2021/0118111 | A1 * | 4/2021 | Ti | G06T 5/50 |
| 2022/0094847 | A1 * | 3/2022 | Yang | G06F 16/785 |
| 2022/0351509 | A1 * | 11/2022 | Kanemura | G06V 20/68 |
| 2026/0020778 | A1 * | 1/2026 | Goodwin | A61B 5/1128 |

FOREIGN PATENT DOCUMENTS

| | | | | |
|---|---|---|---|---|
| CN | 113920066 A | | 1/2022 | |
| CN | 114463257 A | * | 5/2022 | G06F 18/241 |

OTHER PUBLICATIONS

CN-112380952-B Oct. 11, 2022—machine English translation (Year: 2022).*
CN-112733950-A Apr. 30, 2021—machine English translation (Year: 2021).*
CN-113920066-A Jan. 11, 2022—machine English translation (Year: 2022).*
CN-114155178-A Mar. 8, 2022—machine English translation (Year: 2022).*
CN-114463257-A May 10, 2022—machine English translation (Year: 2022).*
YOLOv3: An Incremental Improvement, Redmon et al (Year: 2018).*
YOLOv3 for Objection Detection (Year: 2018).*
WIPO, International Search Report from International Application No. PCT/CN2023/091026, Apr. 27, 2023, 3 pages.
Seonkyeoung Seoung, “Semantic Segmentation of Urban Buildings Using a High-Resolution Network (HRNet) with Channel and Spatial Attention Gates,” Remote Sensing, vol. 13, No. 16, Aug. 5, 2021, pp. 1-18.

* cited by examiner

DETECTION METHOD AND SYSTEM OF POWER EQUIPMENT BASED ON MULTISPECTRAL IMAGE

CROSS REFERENCE TO RELATED APPLICATION

The present application is a national phase application of International Patent Application No. PCT/CN2023/091026, filed on Apr. 27, 2023, which claims priority to the Chinese Patent Application No. 202211463040.0, filed with the China National Intellectual Property Administration on Nov. 21, 2022, and entitled "DETECTION METHOD AND SYSTEM OF POWER EQUIPMENT BASED ON ATTENTION ADAPTATION OF MULTISPECTRAL IMAGE", which is incorporated herein by reference in its entirety.

TECHNICAL FIELD

The present disclosure relates to the field of smart grid information technology, and in particular, to a detection method and system of power equipment based on a multispectral image.

BACKGROUND

Currently, infrared, ultraviolet and visible light detection for power equipment is completely performed manually, which has a huge workload of analysis and processing, and has high requirements on professionalism and work experience of inspectors, and detection results are subjective to a certain degree. With the development of artificial intelligence technology, in the future, the infrared, ultraviolet and visible light detection technology should develop in the direction of intelligent identification and analysis, to form an accurate evaluation system and establish a standardized management platform so as to improve support for power equipment state evaluation management.

Since there are many types of power equipment and their structures are complex, the premise of power equipment state evaluation is power equipment type identification and detection of regional key information. However, existing infrared, ultraviolet and visible light detection has the problems of heavy manual workload and insufficient accuracy.

SUMMARY

Against the technical problems to be solved, the present disclosure provides a detection method and system of power equipment based on a multispectral image, which can improve efficiency and accuracy of power equipment detection.

To solve the technical problems, in an aspect of the present disclosure, a detection method of power equipment based on a multi-spectral image is provided, including at least the following steps:

step S10: obtaining an image of power equipment to be detected, where the image is one of an infrared image, an ultraviolet image, and a visible image;

step S11: inputting the image into a pre-trained pixel-based power equipment detection model for detection, and performing classified prediction on pixels in the image to obtain a predicted result, where the power equipment detection model includes at least a trunk feature extraction unit, a feature integration processing unit, an attention adaptive processing unit, and a prediction and conversion unit; and step S12: outputting a predicted image based on the predicted result, where the predicted image is power equipment image with background information removed, and is marked with a name of each piece of equipment.

Preferably, step S11 further includes:

step S110: converting the image into a predetermined size, and extracting a predetermined number of classes of preliminary effective features in the image by using the trunk feature extraction unit;

step S111: upsampling the predetermined number of classes of preliminary effective features, and performing feature integration to obtain an integrated-feature layer;

step S112: processing the integrated-feature layer by using the attention adaptive processing unit to obtain a processed adaptive integrated-feature layer;

step S113: predicting the processed adaptive integrated-feature layer to obtain a result of classified prediction of the pixels in the image; and step S114: converting, based on the result of classified prediction of the pixels, gray levels of background pixels of the pixels into a predetermined value.

Preferably, the attention adaptive processing unit further includes a channel attention processing unit, a spatial attention processing unit, and a weighting processing unit, and step S112 further includes:

step S1120: inputting the integrated-feature layer into the channel attention processing unit for processing to obtain a channel attention weight of each channel of the integrated-feature layer, and weighting the integrated-feature layer by using the channel attention weight to obtain a channel integrated-feature layer;

step S1121: inputting the integrated-feature layer into the spatial attention processing unit for processing to obtain a spatial attention weight of each feature point of the integrated-feature layer, and weighting the integrated-feature layer by using the spatial attention weight to obtain a spatial integrated-feature layer; and step S1122: weighting each feature in the channel integrated-feature layer and the spatial integrated-feature layer by using the following formula based on a variable coefficient to obtain an $$g(x) = a * sp(x) + (1 - a) * ch(x)$$

where sp(x) is a feature value of the channel integrated-feature layer, ch(x) is a feature value of the spatial integrated-feature layer, g(x) is a feature value of the adaptive integrated-feature layer, and a is the variable coefficient.

Preferably, the variable coefficient a is updated based on a model training loss value by using the following formula:

$$a = a - a\frac{\partial \text{ Loss}}{\partial t}$$

where Loss is a deviation from a true value during training of the power equipment detection model.

Preferably, step S1120 further includes:

performing global average pooling and global max pooling on the input integrated-feature layer;

processing results of the average pooling and the max pooling by using a shared fully connected layer, and adding the two results processed by the fully connected layer;

processing a result of the adding by using a Sigmoid activation function to obtain the channel attention weight of each channel of the integrated-feature layer; and multiplying the channel attention weight by an original integrated-feature layer.

Preferably, step S1121 further includes:

for the input integrated-feature layer, taking a maximum value and an average value on a channel of each feature point;

stacking the two results, and then adjusting a number of channels by using a convolutional layer;

processing by using the Sigmoid activation function after the number of channels is adjusted, to obtain the spatial attention weight of each feature point of the integrated-feature layer; and multiplying the spatial attention weight by the original integrated-feature layer.

Preferably, a formula for calculating the Sigmoid activation function is as follows:

$$f(x) = \frac{1}{1+e^{-x}}.$$

Preferably, the method further includes:

training, by using a training set, the pixel-based power equipment detection model pre-established by using an artificial intelligence platform TensorFlow, to obtain a trained pixel-based power equipment detection model.

Correspondingly, in another aspect of the present disclosure, a detection system of power equipment based on a multi-spectral image is further provided, including at least:

a detection image acquisition unit, configured to obtain an image of power equipment to be detected, where the image is one of an infrared image, an ultraviolet image, and a visible image;

a prediction processing unit, configured to input the image into a pre-trained pixel-based power equipment detection model for detection, and perform classified prediction on pixels in the image to obtain a predicted result; and a predicted result output unit, configured to output a predicted image with the same size as the image based on the predicted result, where the predicted image is power equipment image with background information removed, and is marked with a name of each piece of equipment.

Preferably, the prediction processing unit further includes:

a trunk feature extraction unit, configured to convert the image into a predetermined size, and extract a predetermined number of classes of preliminary effective features in the image;

a feature integration processing unit, configured to upsample the predetermined number of classes of preliminary effective features, and perform feature integration to obtain an integrated-feature layer;

an attention adaptive processing unit, configured to process the integrated-feature layer by using the attention adaptive processing unit to obtain a processed adaptive integrated-feature layer; and a prediction and conversion unit, configured to predict the processed adaptive integrated-feature layer to obtain a result of classified prediction of the pixels in the image, and convert, based on the result of classified prediction of the pixels, gray levels of background pixels of the pixels into a predetermined value, The attention adaptive processing unit further includes:

a channel attention processing unit, configured to process the integrated-feature layer to obtain a channel attention weight of each channel of the integrated-feature layer, and weight the integrated-feature layer by using the channel attention weight to obtain a channel integrated-feature layer;

a spatial attention processing unit, configured to process the integrated-feature layer to obtain a spatial attention weight of each feature point of the integrated-feature layer, and weight the integrated-feature layer by using the spatial attention weight to obtain a spatial integrated-feature layer; and a weighting processing unit, configured to weight each feature in the channel integrated-feature layer and the spatial integrated-feature layer by using the following formula based on a variable coefficient to obtain an adaptive integrated-feature layer, $$g(x) = a * sp(x) + (1-a) * ch(x)$$

where sp(x) is a feature value of the channel integrated-feature layer, ch(x) is a feature value of the spatial integrated-feature layer, g(x) is a feature value of the adaptive integrated-feature layer, and a is the variable coefficient.

The embodiments of the present disclosure have the following beneficial effects:

The present disclosure provides a detection method and system of power equipment based on a multispectral image, which can quickly identify power equipment and types in a multi-spectral image (infrared, ultraviolet or visible image) by using a pixel-based power equipment detection algorithm and an image attention adaptive optimization method, and improve efficiency and accuracy of power equipment identification. A threshold brought by professionalism and experience can be lowered, and great convenience is provided for power equipment maintenance and operation staff.

In addition, adaptive learning of key information of the image is realized by using an attention mechanism method, so that redundancy of the model can be optimized, thereby improving application universality of the present disclosure.

BRIEF DESCRIPTION OF THE DRAWINGS

To describe the technical solutions in the embodiments of the present disclosure or in the prior art more clearly, accompanying drawings required for describing the embodiments or the prior art are briefly described below. Apparently, the accompanying drawings in the following description show some embodiments of the present disclosure, and a person of ordinary skill in the art may still derive other drawings from these accompanying drawings without creative efforts.

DETAILED DESCRIPTION OF THE EMBODIMENTS

Technical solutions of embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

Herein, it should also be noted that, to avoid obscuring the present disclosure due to unnecessary details, only the structure and/or processing steps closely related to the solutions of the present disclosure are shown in the accompanying drawings, and other details not greatly related to the present disclosure are omitted.

Figure 1:
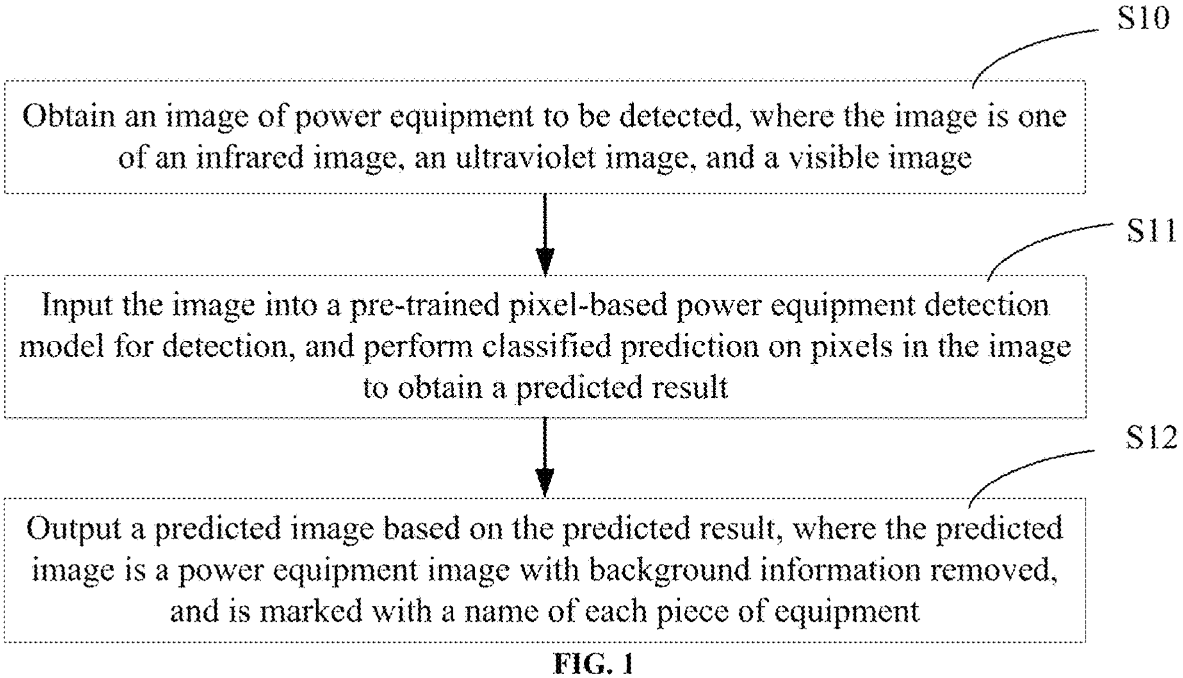
FIG. 1 is a schematic main flowchart of a detection method of power equipment based on a multispectral image according to an embodiment of the present disclosure.

FIG. 1 is a schematic main flowchart of a detection method of power equipment based on a multispectral image according to an embodiment of the present disclosure. Referring to FIGS. 2 to 5 together, in this embodiment, the detection method of power equipment includes at least the following steps.

Step S10: Obtain an image of power equipment to be detected, where the image is one of an infrared image, an ultraviolet image, and a visible image.

In embodiments of the present disclosure, the obtained image only needs to be one of an infrared image, an ultraviolet image, and a visible image, and an image input format may be JPG or PNG format.

Step S11: Input the image into a pre-trained pixel-based power equipment detection model for detection, and perform classified prediction on pixels in the image to obtain a predicted result, where the power equipment detection model includes at least a trunk feature extraction unit, a feature integration processing unit, an attention adaptive processing unit, and a prediction and conversion unit.

Figure 2:
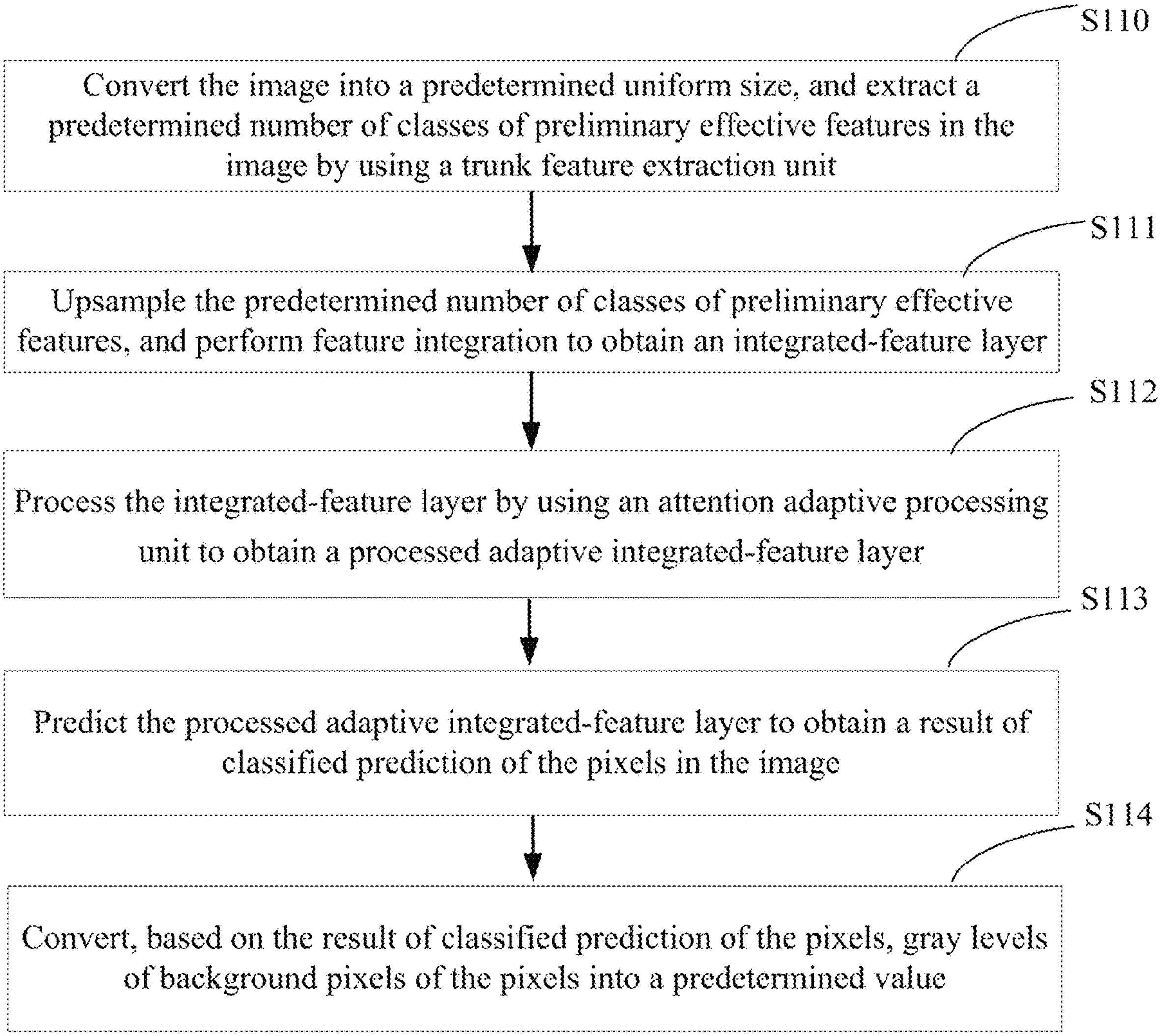
FIG. 2 is a more detailed schematic flowchart of step S11 in FIG. 1.

In a specific example, as shown in FIG. 2, step S11 further includes the following steps.

Step S110: Convert (resize) the image into a predetermined uniform size, and extract a predetermined number of classes of preliminary effective features in the image by using the trunk feature extraction unit.

Step S111: Upsample the predetermined number of classes of preliminary effective features, and perform feature integration to obtain an integrated-feature layer.

Step S112: Process the integrated-feature layer by using the attention adaptive processing unit to obtain a processed adaptive integrated-feature layer.

Further, in an example, the attention adaptive processing unit further includes a channel attention processing unit, a spatial attention processing unit, and a weighting processing unit, and step S112 further includes the following steps.

Step S1120: Input the integrated-feature layer into the channel attention processing unit for processing to obtain a channel attention weight of each channel of the integrated-feature layer, and weight the integrated-feature layer by using the channel attention weight to obtain a channel integrated-feature layer.

Figure 3:
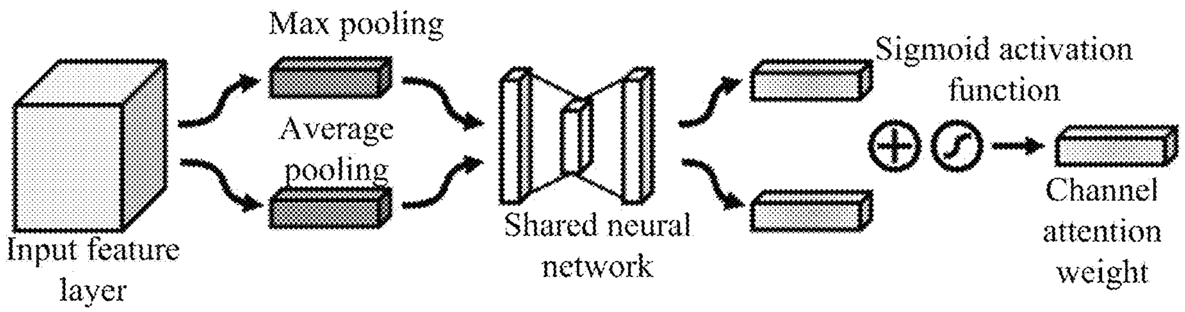
FIG. 3 is a schematic diagram of a principle of a channel attention processing unit according to the present disclosure.

Specifically, as shown in FIG. 3, step S1120 further includes:

- performing global average pooling and global max pooling on the input integrated-feature layer;
- processing results of the average pooling and the max pooling by using a shared fully connected layer, and adding the two results processed by the fully connected layer;
- processing a result of the adding by using a Sigmoid activation function to obtain the channel attention weight (between 0 and 1) of each channel of the integrated-feature layer; and
- multiplying the channel attention weight by an original integrated-feature layer.

Step S1121: Input the integrated-feature layer into the spatial attention processing unit for processing to obtain a spatial attention weight of each feature point of the integrated-feature layer, and weight the integrated-feature layer by using the spatial attention weight to obtain a spatial integrated-feature layer.

Figure 4:
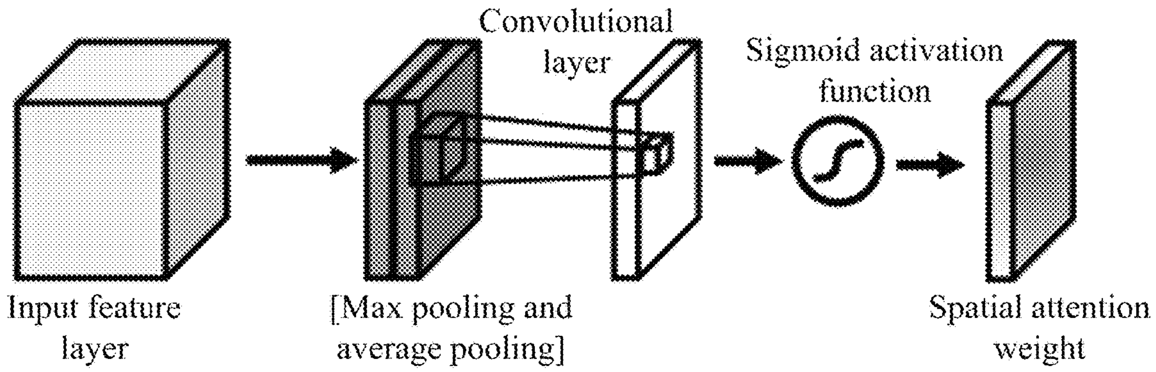
FIG. 4 is a schematic diagram of a principle of a spatial attention processing unit according to the present disclosure.
Figure 5:
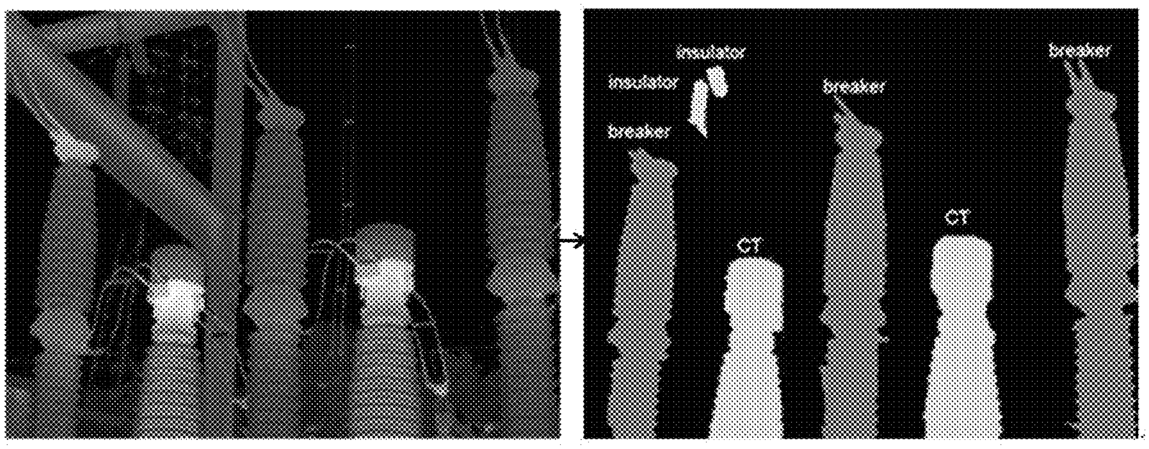
FIG. 5 is a schematic diagram of a comparison between an image of power equipment to be detected and a predicted image in an example of the present disclosure.

Specifically, as shown in FIG. 4, step S1121 further includes:

- for the input integrated-feature layer, taking a maximum value and an average value on a channel of each feature point;
- stacking the two results, and then adjusting a number of channels by using a convolutional layer;
- processing by using the Sigmoid activation function after the number of channels is adjusted, to obtain the spatial attention weight (between 0 and 1) of each feature point of the integrated-feature layer; and
- multiplying the spatial attention weight by the original integrated-feature layer.

It can be understood that in this embodiment, a formula for calculating the Sigmoid activation function involved in steps S1120 and S1121 is as follows:

$$f(x) = \frac{1}{1 + e^{-x}}.$$

Step S1122: Weight each feature in the channel integrated-feature layer and the spatial integrated-feature layer by using the following formula based on a variable coefficient to obtain an $$g(x) = a * sp(x) + (1 - a) * ch(x)$$

where sp(x) is a feature value of the channel integrated-feature layer, ch(x) is a feature value of the spatial integrated-feature layer, g(x) is a feature value of the adaptive integrated-feature layer, a is the variable coefficient, x is an input value, herein corresponding to the aforementioned input feature layer, which is usually a feature matrix, and is a matrix composed of values representing image features.

Preferably, the variable coefficient a is updated based on a model training loss value by using the following formula:

$$a = a - a\frac{\partial \text{ Loss}}{\partial t}$$

where Loss is a deviation from a true value during training of the power equipment detection model, a on the left side of the equal sign indicates an updated variable coefficient, and a on the right side of the equal sign indicates the variable coefficient before updating. It can be understood that by performing the above steps, adaptation of an image attention mechanism can be realized, and redundancy of the power equipment detection model can be optimized.

Step S113: Predict the processed adaptive integrated-feature layer to obtain a result of classified prediction of the pixels in the image.

Step S114: Convert, based on the result of classified prediction of the pixels, gray levels of background pixels of the pixels into a predetermined value (to filter out the background).

Step S12: Output a predicted image based on the predicted result, where the predicted image is power equipment image with background information removed, and is marked with a name of each piece of equipment. A specific effect may be shown in FIG. 5, where the image on the left is the image of the input model and the image on the right is the predicted image.

It can be understood that in the present disclosure, the method needs to further include:

training, by using a training set, the pixel-based power equipment detection model pre-established by using an artificial intelligence platform TensorFlow, to obtain a trained pixel-based power equipment detection model.

It can be understood that the power equipment detection model can predict image pixels by means of a codec structure. In the trained pixel-based power equipment detection model, the trunk feature extraction unit is configured to obtain one feature layer after another, and extract five preliminary effective features under stack of convolution and max pooling; the feature integration processing unit is configured to upsample the five preliminary effective features and perform feature integration to obtain an integrated-feature layer; the attention adaptive processing unit is configured to process the integrated-feature layer to obtain a processed adaptive integrated-feature layer; and the prediction and conversion unit is configured to predict the processed adaptive integrated-feature layer to obtain a result of classified prediction of the pixels in the image, and convert, based on the result of classified prediction of the pixels, gray levels of background pixels of the pixels into a predetermined value (that is, filter out the background).

Figure 6:
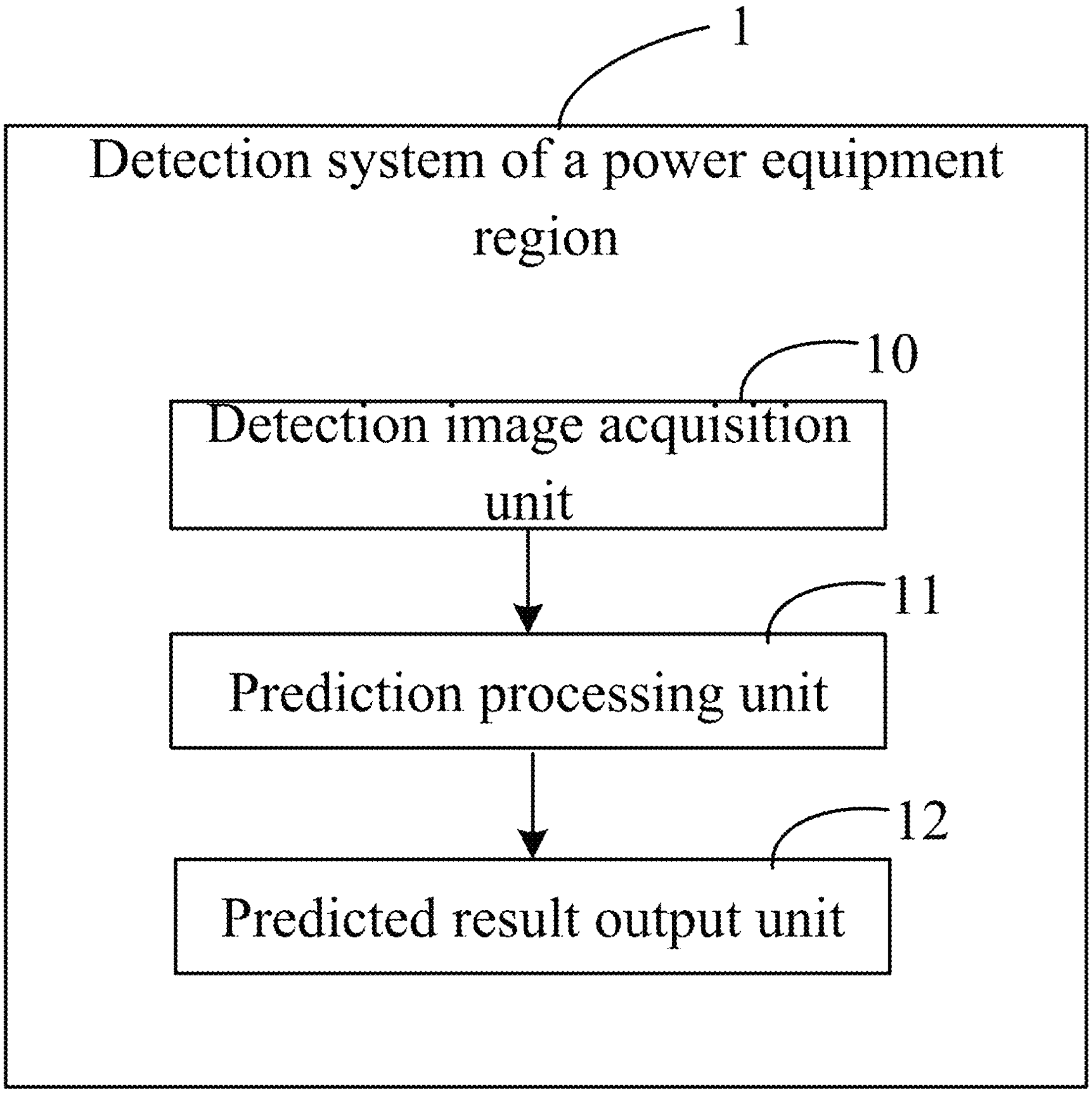
FIG. 6 is a schematic structural diagram of a detection system of power equipment based on a multispectral image according to an embodiment of the present disclosure.
Figure 7:
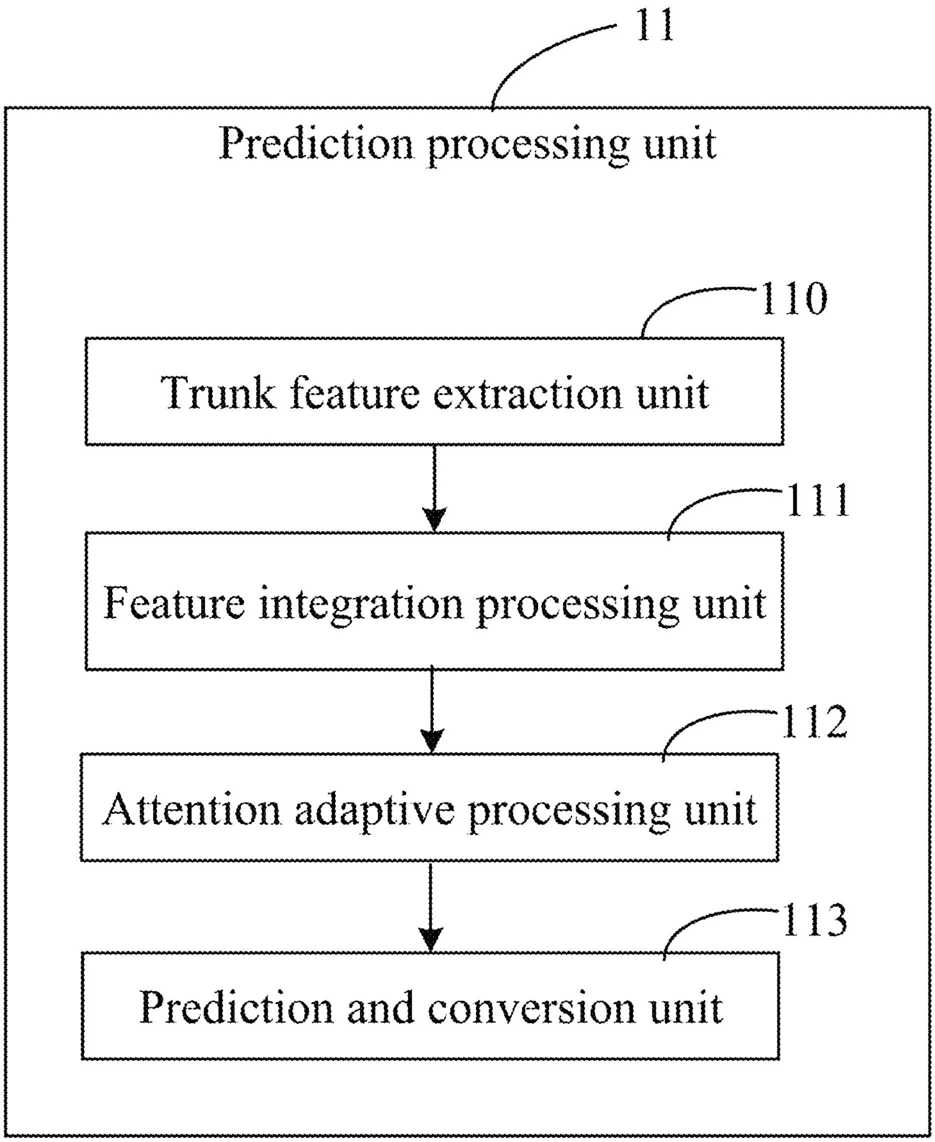
FIG. 7 is a schematic structural diagram of a prediction processing unit in FIG. 6.
Figure 8:
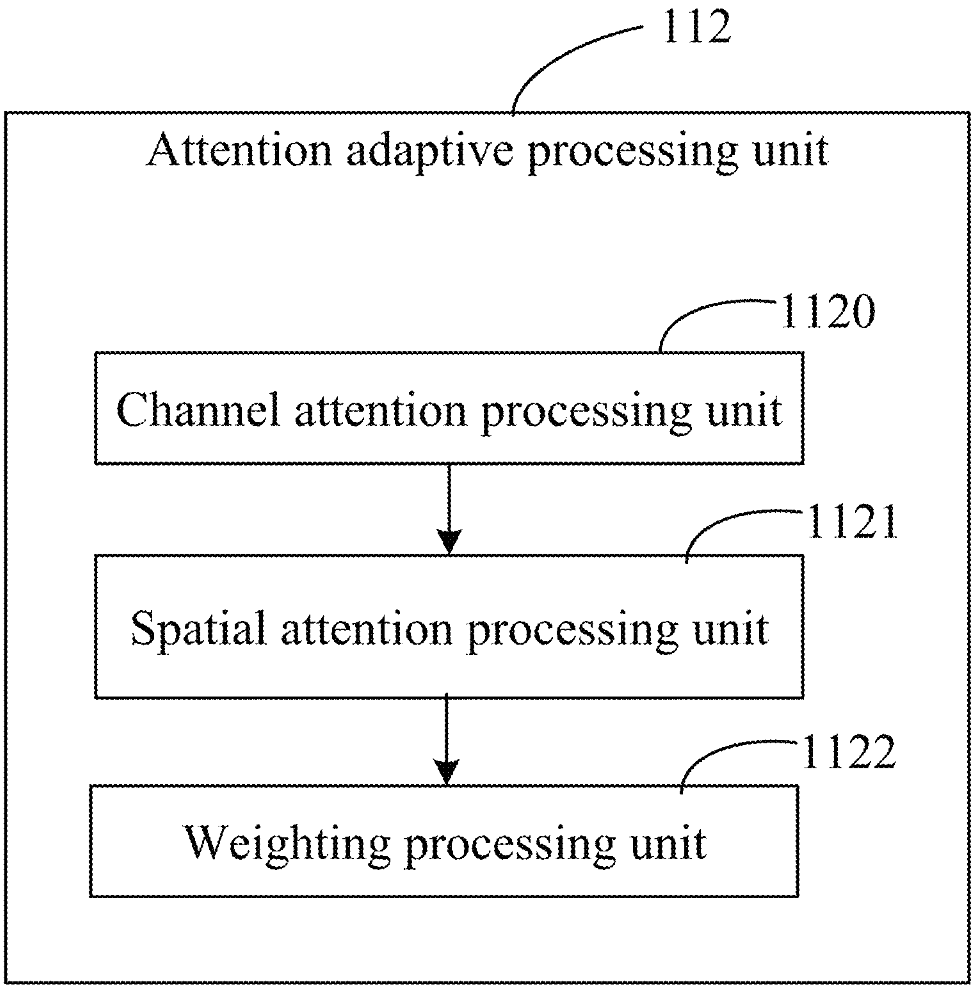
FIG. 8 is a schematic structural diagram of an attention adaptive processing unit in FIG. 7.

FIG. 6 is a schematic structural diagram of a detection system of power equipment based on a multispectral image according to an embodiment of the present disclosure. Referring to FIGS. 7 and 8 together, the detection system 1 of power equipment includes at least:

a detection image acquisition unit 10, configured to obtain an image of power equipment to be detected, where the image is one of an infrared image, an ultraviolet image, and a visible image;

a prediction processing unit 11, configured to input the image into a pre-trained pixel-based power equipment detection model for detection, and perform classified prediction on pixels in the image to obtain a predicted result; and a predicted result output unit 12, configured to output a predicted image with the same size as the image based on the predicted result, where the predicted image is power equipment image with background information removed, and is marked with a name of each piece of equipment.

More specifically, as shown in FIG. 7, the prediction processing unit 11 further includes:

a trunk feature extraction unit 110, configured to convert the image into a predetermined size, and extract a predetermined number of classes of preliminary effective features in the image;

a feature integration processing unit 111, configured to upsample the predetermined number of classes of preliminary effective features, and perform feature integration to obtain an integrated-feature layer;

an attention adaptive processing unit 112, configured to process the integrated-feature layer by using the attention adaptive processing unit to obtain a processed adaptive integrated-feature layer; and a prediction and conversion unit 113, configured to predict the processed adaptive integrated-feature layer to obtain a result of classified prediction of the pixels in the image, and convert, based on the result of classified prediction of the pixels, gray levels of background pixels of the pixels into a predetermined value.

More specifically, as shown in FIG. 8, the attention adaptive processing unit 112 further includes:

a channel attention processing unit 1120, configured to process the integrated-feature layer to obtain a channel attention weight of each channel of the integrated-feature layer, and weight the integrated-feature layer by using the channel attention weight to obtain a channel integrated-feature layer;

a spatial attention processing unit 1121, configured to process the integrated-feature layer to obtain a spatial attention weight of each feature point of the integrated-feature layer, and weight the integrated-feature layer by using the spatial attention weight to obtain a spatial integrated-feature layer; and a weighting processing unit 1122, configured to weight each feature in the channel integrated-feature layer and the spatial integrated-feature layer by using the following formula based on a variable coefficient to obtain an adaptive integrated-feature layer, $$g(x) = a * sp(x) + (1 - a) * ch(x)$$

where sp(x) is a feature value of the channel integrated-feature layer, ch(x) is a feature value of the spatial integrated-feature layer, g(x) is a feature value of the adaptive integrated-feature layer, and a is the variable coefficient.

The variable coefficient a is updated based on a model training loss value by using the following formula:

$$a = a - a\frac{\partial \text{ Loss}}{\partial t}$$

where Loss is a deviation from a true value during training of the power equipment detection model.

For more details, reference may be made to the aforementioned descriptions of FIGS. 1 to 5, which will not be repeated herein.

The embodiments of the present disclosure have the following beneficial effects:

The present disclosure provides a detection method and system of power equipment based on a multispectral image, which can quickly identify power equipment and types in a multi-spectral image (infrared, ultraviolet or visible image) by using a pixel-based power equipment detection algorithm and an image attention adaptive optimization method, and improve efficiency and accuracy of power equipment identification. A threshold brought by professionalism and experience can be lowered, and great convenience is provided for power equipment maintenance and operation staff.

In addition, adaptive learning of key information of the image is realized by using an attention mechanism method, so that redundancy of the model can be optimized, thereby improving application universality of the present disclosure.

Persons skilled in the art should understand that the embodiments of the present disclosure may be provided as a method, a device or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that each flow and/or block in the flowchart and/or block diagram and a combination of the flow and/or block in the flowchart and/or block diagram can be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus configured to implement a function specified in one or more flows of the flowchart and/or one or more blocks of the block diagram.

The above descriptions are merely preferred embodiments of the present disclosure, and are not intended to limit the scope of the claims of the present disclosure, and thus all other equivalent changes or modifications that are completed without departing from the spirit disclosed by the present disclosure should fall within the scope of the claims of the present disclosure.

What is claimed is:

1. A detection method of power equipment based on a multispectral image, comprising at least the following steps:

step S10: obtaining an image of power equipment to be detected, wherein the image is one of an infrared image, an ultraviolet image, and a visible image;

step S11: inputting the image into a pre-trained pixel-based power equipment detection model for detection, and performing classified prediction on pixels in the image to obtain a predicted result, wherein the power equipment detection model comprises at least a trunk feature extraction unit, a feature integration processing unit, an attention adaptive processing unit, and a prediction and conversion unit; and step S12: outputting a predicted image based on the predicted result, wherein the predicted image is power equipment image with background information removed, and is marked with a name of each piece of equipment, wherein step S11 further comprises:

step S110: converting the image into a predetermined size, and extracting a predetermined number of classes of preliminary effective features in the image by using the trunk feature extraction unit;

step S111: upsampling the predetermined number of classes of preliminary effective features, and performing feature integration to obtain an integrated-feature layer;

step S112: processing the integrated-feature layer by using the attention adaptive processing unit to obtain a processed adaptive integrated-feature layer;

step S113: predicting the processed adaptive integrated-feature layer to obtain a result of classified prediction of the pixels in the image; and step S114: converting, based on the result of classified prediction of the pixels, gray levels of background pixels of the pixels into a predetermined value, wherein the attention adaptive processing unit further comprises a channel attention processing unit, a spatial attention processing unit, and a weighting processing unit, and step S112 further comprises:

step S1120: inputting the integrated-feature layer into the channel attention processing unit for processing to obtain a channel attention weight of each channel of the integrated-feature layer, and weighting the integrated-feature layer by using the channel attention weight to obtain a channel integrated-feature layer;

step S1121: inputting the integrated-feature layer into the spatial attention processing unit for processing to obtain a spatial attention weight of each feature point of the integrated-feature layer, and weighting the integrated-feature layer by using the spatial attention weight to obtain a spatial integrated-feature layer; and step S1122: weighting each feature in the channel integrated-feature layer and the spatial integrated-feature layer by using the following formula based on a variable coefficient to obtain an adaptive integrated-feature layer, $$g(x) = a * sp(x) + (1 - a) * ch(x)$$

wherein sp(x) is a feature value of the channel integrated-feature layer, ch(x) is a feature value of the spatial integrated-feature layer, g(x) is a feature value of the adaptive integrated-feature layer, and a is the variable coefficient.

2. The detection method according to claim 1, further comprising updating the variable coefficient a based on a model training loss value by using the following formula:

$$a = a - a\frac{\partial \text{ Loss}}{\partial t}$$

wherein Loss is a deviation from a true value during training of the power equipment detection model.

3. The detection method according to claim 2, wherein step S1120 further comprises:

performing global average pooling and global max pooling on the input integrated-feature layer;

processing results of the average pooling and the max pooling by using a shared fully connected layer, and adding the two results processed by the fully connected layer;

processing a result of the adding by using a Sigmoid activation function to obtain the channel attention weight of each channel of the integrated-feature layer; and multiplying the channel attention weight by an original integrated-feature layer.

4. The detection method according to claim 3, wherein step S1121 further comprises:

for the input integrated-feature layer, taking a maximum value and an average value on a channel of each feature point;

stacking the two results, and then adjusting a number of channels by using a convolutional layer;

processing by using the Sigmoid activation function after the number of channels is adjusted, to obtain the spatial attention weight of each feature point of the integrated-feature layer; and multiplying the spatial attention weight by the original integrated-feature layer.

5. The detection method according to claim 3, wherein a formula for calculating the Sigmoid activation function is as follows:

$$f(x) = \frac{1}{1 + e^{-x}}.$$

6. The detection method according to claim 5, further comprising:

training, by using a training set, the pixel-based power equipment detection model pre-established by using an artificial intelligence platform TensorFlow, to obtain a trained pixel-based power equipment detection model.

7. The detection method according to claim 4, wherein a formula for calculating the Sigmoid activation function is as follows:

$$f(x) = \frac{1}{1 + e^{-x}}.$$

8. The detection method according to claim 7, further comprising:

training, by using a training set, the pixel-based power equipment detection model pre-established by using an artificial intelligence platform TensorFlow, to obtain a trained pixel-based power equipment detection model.

9. A detection system of power equipment based on a multispectral image, comprising at least:

a detection image acquisition unit, configured to obtain an image of power equipment to be detected, wherein the image is one of an infrared image, an ultraviolet image, and a visible image;

a prediction processing unit, configured to input the image into a pre-trained pixel-based power equipment detection model for detection, and perform classified prediction on pixels in the image to obtain a predicted result; and a predicted result output unit, configured to output a predicted image with the same size as the image based on the predicted result, wherein the predicted image is power equipment image with background information removed, and is marked with a name of each piece of equipment, wherein the prediction processing unit further comprises:

a trunk feature extraction unit, configured to convert the image into a predetermined size, and extract a predetermined number of classes of preliminary effective features in the image;

a feature integration processing unit, configured to upsample the predetermined number of classes of preliminary effective features, and perform feature integration to obtain an integrated-feature layer;

an attention adaptive processing unit, configured to process the integrated-feature layer by using the attention adaptive processing unit to obtain a processed adaptive integrated-feature layer; and a prediction and conversion unit, configured to predict the processed adaptive integrated-feature layer to obtain a result of classified prediction of the pixels in the image, and convert, based on the result of classified prediction of the pixels, gray levels of background pixels of the pixels into a predetermined value, wherein the attention adaptive processing unit further comprises:

a channel attention processing unit, configured to process the integrated-feature layer to obtain a channel attention weight of each channel of the integrated-feature layer, and weight the integrated-feature layer by using the channel attention weight to obtain a channel integrated-feature layer;

a spatial attention processing unit, configured to process the integrated-feature layer to obtain a spatial attention weight of each feature point of the integrated-feature layer, and weight the integrated-feature layer by using the spatial attention weight to obtain a spatial integrated-feature layer; and a weighting processing unit, configured to weight each feature in the channel integrated-feature layer and the spatial integrated-feature layer by using the following formula based on a variable coefficient to obtain an adaptive integrated-feature layer, $$g(x) = a * sp(x) + (1 - a) * ch(x)$$

wherein sp(x) is a feature value of the channel integrated-feature layer, ch(x) is a feature value of the spatial integrated-feature layer, g(x) is a feature value of the adaptive integrated-feature layer, and a is the variable coefficient.

* * * * *